US011256001B2

(12) United States Patent
Kourtakis et al.

(10) Patent No.: US 11,256,001 B2
(45) Date of Patent: Feb. 22, 2022

(54) LOW HAZE POLYMER FILMS AND ELECTRONIC DEVICES

(71) Applicant: DUPONT ELECTRONICS, INC., Wilmington, DE (US)

(72) Inventors: Kostantinos Kourtakis, Media, PA (US); Gene M Rossi, Wilmington, DE (US)

(73) Assignee: DUPONT ELECTRONICS, INC., Wilmington, DE (US)

(*) Notice: Subject to any disclaimer, the term of this patent is extended or adjusted under 35 U.S.C. 154(b) by 0 days.

(21) Appl. No.: 16/654,504

(22) Filed: Oct. 16, 2019

(65) Prior Publication Data
US 2020/0123336 A1 Apr. 23, 2020

Related U.S. Application Data

(60) Provisional application No. 62/749,277, filed on Oct. 23, 2018.

(51) Int. Cl.
| | | |
|---|---|---|
| *G02B 1/04* | (2006.01) | |
| *C08G 73/10* | (2006.01) | |
| *C08K 3/36* | (2006.01) | |
| *C08K 3/22* | (2006.01) | |

(52) U.S. Cl.
CPC ........... *G02B 1/04* (2013.01); *C08G 73/1067* (2013.01); *C08J 2379/08* (2013.01); *C08K 3/36* (2013.01); *C08K 2003/2241* (2013.01); *C08K 2201/001* (2013.01); *C08K 2201/011* (2013.01); *Y10T 428/24942* (2015.01)

(58) Field of Classification Search
CPC ....... C08G 73/10–73/16; C08L 79/08–79/085; C08K 3/36; G02B 1/00–1/18
See application file for complete search history.

(56) References Cited

U.S. PATENT DOCUMENTS

| | | |
|---|---|---|
| 2,801,185 A | 7/1957 | Iler |
| 4,522,958 A | 6/1985 | Das et al. |
| 5,166,308 A | 11/1992 | Kreuz et al. |
| 5,298,331 A | 3/1994 | Kanakarajan et al. |
| 5,648,407 A | 7/1997 | Goetz et al. |
| 2005/0025976 A1 | 2/2005 | Faris |
| 2009/0279176 A1* | 11/2009 | Wang ..................... B82Y 20/00 359/601 |
| 2013/0736127 | 7/2013 | Lee et al. |
| 2016/0096927 A1* | 4/2016 | Jee ..................... C08G 73/1007 524/600 |
| 2016/0122483 A1 | 5/2016 | Sun et al. |
| 2016/0340551 A1* | 11/2016 | Lin ..................... C09D 183/06 |
| 2017/0327654 A1* | 11/2017 | Ikeuchi ..................... G02B 1/04 |
| 2018/0112049 A1* | 4/2018 | Song ........................ C08J 5/18 |

FOREIGN PATENT DOCUMENTS

| | | |
|---|---|---|
| CN | 203366778 U | 12/2013 |
| JP | 4031624 B2 | 1/2008 |
| JP | 4406921 B2 | 2/2010 |
| TW | 201519262 A | 5/2015 |

OTHER PUBLICATIONS

Matsuura et al. "Polyimide derived from 2,2'-bis(trifluoromethyl)-4,4'-diaminobiphenyl. 1. Synthesis and characterization of polyimides prepared with 2,2'-bis(3,4-dicarboxyphenyl)hexafluoropropane dianhydride or pyromellitic dianhydride", Macromolecules, 24, 18, (1991); pp. 5001-5005.*

Huang et al. "Hybrid organic-inorganic 6FDA-6pFDA and multi-block 6FDA-DABA polyimide SiO2eTiO2 nanocomposites: Synthesis, FFV, FTIR, swelling, stability, and X-ray scattering", Polymer, 108, (2017); pp. 105-120.*

Liaw et al. "Complementary functionality of SiO2 and TiO2 in polyimide/silica-titania ternary hybrid nanocomposites", Polymer Journal, 43, (2011); pp. 249-257.*

Qiu et al. "Morphology and size control of inorganic particles in polyimide hybrids by using SiO2—TiO2 mixed oxide", Polymer, 44, (2003); pp. 5821-5826.*

Wood, R.W. "The Invisibility of Transparent Objects", Phys. Rev. (Series I), vol. 15, No. 2, (1902); pp. 123-124.*

Liaw, Wen-Chang et al., "Complementary functionality of SiO2 and TiO2 in polyimide/silica-titania ternary hybrid nanocomposites", Polymer Journal, vol. 43, pp. 249-257, 2011.

* cited by examiner

*Primary Examiner* — Prashant J Khatri

(57) ABSTRACT

In a first aspect, a low haze polymer film includes a polymer and a refractive index-matching nanoparticle aggregate. The polymer includes a polyimide, a polyamide imide or a polyester imide, and the refractive index-matching nanoparticle aggregate includes a first nanoparticle having a refractive index that is less than the refractive index of the polymer and a second nanoparticle having a refractive index that is greater than the refractive index of the polymer. A difference in the refractive indices of the polymer and the refractive index-matching nanoparticle aggregate is less than 0.1, and the low haze polymer film has a thickness in a range of from 1 to 150 μm and a haze of less than 4%. In a second aspect, an electronic device includes the low haze polymer film of the first aspect.

14 Claims, No Drawings

LOW HAZE POLYMER FILMS AND ELECTRONIC DEVICES

FIELD OF DISCLOSURE

The field of this disclosure is low haze polymer films and electronic devices.

BACKGROUND OF THE DISCLOSURE

Low haze polymer films, having polyimides, polyamide imides or polyester imides, can potentially replace rigid glass cover sheets and other substrates which are currently used in display applications, such as organic light-emitting diode (OLED) displays. For example, aromatic polyimides are typically very thermally stable, with glass transition temperatures ($T_g$) of greater than 320° C., and have excellent foldability and rollability, a critical property needed for next-generation flexible displays. For polyimide films used in display applications, in addition to having high transmittance and low haze, the polyimide film also needs to be neutral in color. Typical specifications require that both a* and b* are no greater than 1 color unit from neutral (0) in CIE L*, a*, b* color coordinates, i.e., the absolute values of a* and b* should be less than 1. The three coordinates of CIE L*, a*, b* represent: (1) the lightness of the color (L*=0 yields black and L*=100 indicates diffuse white), (2) its position between red/magenta and green (negative a* values indicate green, while positive values indicate magenta) and (3) its position between yellow and blue (negative b* values indicate blue and positive values indicate yellow).

Nanoparticles can be used in polymer films to influence their mechanical properties, thermal properties, electrical properties, etc. However, depending on their size, shape and loading, these nanoparticles can have a negative impact on the optical properties of the film. For optical films, such as an optical polyimide film used in a display, an important requirement is that light scattering is minimized, as measured as a percent haze.

Polyimide nanoparticle composite films, converted from polyamic acid to polyimide using an imidization catalyst, are not optically clear. During the low-temperature, catalyzed imidization process (required to convert polyamic acid to polyimide), nanoparticles coalesce into larger aggregates. These aggregates are light scattering centers which will greatly increase the optical haze of the film. Typically, the size of these aggregates is greater than 200 to 300 nm (in diameter) and the aggregate size approaches the wavelength of visible light. One theory for this phenomenon is that an "imidization" wave leads to a physical rearrangement or shift of polymer chains. If this occurs in the presence of solvent, aggregation of the nanoparticles can occur.

The incorporation of nanoparticles in a chemically converted polyimide film may offer many advantages. Chemical conversion, a process which uses an imidization catalyst, is generally preferred over a process which does not employ a catalyst. Chemically converted films can have improved mechanical properties (e.g., storage modulus, elongation, coefficient of thermal expansion, etc.). These improvements are a consequence of the lower temperature at which imidization initiates, and the resulting increased crystallinity of the polyimide. The incorporation of nanoparticles into a polymer film may potentially impact the functionality of the film surface and, by simple dilution, diminish the film's color (by diluting the charge-transfer imide pairs in the polymer which lead to color), and potentially impact electrical properties. Depending on the nanoparticle aspect ratio and other properties, the nanoparticles may reinforce the polymer to increase the modulus of the film and lower its coefficient of thermal expansion.

SUMMARY

In a first aspect, a low haze polymer film includes a polymer and a refractive index-matching nanoparticle aggregate. The polymer includes a polyimide, a polyamide imide or a polyester imide, and the refractive index-matching nanoparticle aggregate includes a first nanoparticle having a refractive index that is less than the refractive index of the polymer and a second nanoparticle having a refractive index that is greater than the refractive index of the polymer. A difference in the refractive indices of the polymer and the refractive index-matching nanoparticle aggregate is less than 0.1, and the low haze polymer film has a thickness in a range of from 1 to 150 µm and a haze of less than 4%.

In a second aspect, an electronic device includes the low haze polymer film of the first aspect.

The foregoing general description and the following detailed description are exemplary and explanatory only and are not restrictive of the invention, as defined in the appended claims.

DETAILED DESCRIPTION

In a first aspect, a low haze polymer film includes a polymer and a refractive index-matching nanoparticle aggregate. The polymer includes a polyimide, a polyamide imide or a polyester imide, and the refractive index-matching nanoparticle aggregate includes a first nanoparticle having a refractive index that is less than the refractive index of the polymer and a second nanoparticle having a refractive index that is greater than the refractive index of the polymer. A difference in the refractive indices of the polymer and the refractive index-matching nanoparticle aggregate is less than 0.1, and the low haze polymer film has a thickness in a range of from 1 to 150 µm and a haze of less than 4%.

In one embodiment of the first aspect, the the polymer includes a polyimide including a dianhydride selected from the group consisting of 3,3',4,4'-biphenyl tetracarboxylic dianhydride, pyromellitic dianhydride, cyclobutane dianhydride, 4,4'-(hexafluoroisopropylidene)diphthalic anhydride and mixtures thereof.

In another embodiment of the first aspect, the polymer includes a polyimide including a fluorinated dianhydride. In a specific embodiment, the fluorinated dianhydride includes 4,4'-(hexafluoroisopropylidene)diphthalic anhydride.

In still another embodiment of the first aspect, the polymer includes a polyimide including a fluorinated diamine. In a specific embodiment, the fluorinated diamine includes 2,2'-bis(trifluoromethyl) benzidine.

In yet another embodiment of the first aspect, the first nanoparticle is selected from the group consisting of silicon oxide, porous silicon oxide, a group I metal fluoride, a group II metal fluoride and mixtures thereof.

In still yet another embodiment of the first aspect, the second nanoparticle is selected from the group consisting of titanium dioxide, zirconium oxide, niobium oxide, tantalum oxide, zinc oxide, barium oxide, tin oxide, cerium oxide, antimony oxide, yttrium oxide, aluminum oxide and mixtures thereof.

In a further embodiment of the first aspect, the low haze polymer film has an L* of greater than 90.

In still a further embodiment of the first aspect, the low haze polymer film has a thickness in a range of from 5 to 125 µm.

In yet a further embodiment of the first aspect, the refractive index-matching nanoparticle aggregate is present in the low haze polymer film in an amount in the range of from 0.001 to 70 volume percent.

In a second aspect, an electronic device includes the low haze polymer film of the first aspect.

In one embodiment of the second aspect, the low haze polymer film is used in device components selected from the group consisting of device substrates, substrates for color filter sheets, cover sheets, and touch sensor panels. In a specific embodiment, the cover sheet further includes a hard coat layer, an anti-reflection layer, or both a hard coat layer and anti-reflection layer.

Many aspects and embodiments have been described above and are merely exemplary and not limiting. After reading this specification, skilled artisans appreciate that other aspects and embodiments are possible without departing from the scope of the invention. Other features and advantages of the invention will be apparent from the following detailed description, and from the claims.

Depending upon context, "diamine" as used herein is intended to mean: (i) the unreacted form (i.e., a diamine monomer); (ii) a partially reacted form (i.e., the portion or portions of an oligomer or other polymer precursor derived from or otherwise attributable to diamine monomer) or (iii) a fully reacted form (the portion or portions of the polymer derived from or otherwise attributable to diamine monomer). The diamine can be functionalized with one or more moieties, depending upon the particular embodiment selected in the practice of the present invention.

Indeed, the term "diamine" is not intended to be limiting (or interpreted literally) as to the number of amine moieties in the diamine component. For example, (ii) and (iii) above include polymeric materials that may have two, one, or zero amine moieties. Alternatively, the diamine may be functionalized with additional amine moieties (in addition to the amine moieties at the ends of the monomer that react with dianhydride to propagate a polymeric chain). Such additional amine moieties could be used to crosslink the polymer or to provide other functionality to the polymer.

Similarly, the term "dianhydride" as used herein is intended to mean the component that reacts with (is complimentary to) the diamine and in combination is capable of reacting to form an intermediate (which can then be cured into a polymer). Depending upon context, "anhydride" as used herein can mean not only an anhydride moiety per se, but also a precursor to an anhydride moiety, such as: (i) a pair of carboxylic acid groups (which can be converted to anhydride by a de-watering or similar-type reaction); or (ii) an acid halide (e.g., chloride) ester functionality (or any other functionality presently known or developed in the future which is) capable of conversion to anhydride functionality.

Depending upon context, "dianhydride" can mean: (i) the unreacted form (i.e. a dianhydride monomer, whether the anhydride functionality is in a true anhydride form or a precursor anhydride form, as discussed in the prior above paragraph); (ii) a partially reacted form (i.e., the portion or portions of an oligomer or other partially reacted or precursor polymer composition reacted from or otherwise attributable to dianhydride monomer) or (iii) a fully reacted form (the portion or portions of the polymer derived from or otherwise attributable to dianhydride monomer).

The dianhydride can be functionalized with one or more moieties, depending upon the particular embodiment selected in the practice of the present invention. Indeed, the term "dianhydride" is not intended to be limiting (or interpreted literally) as to the number of anhydride moieties in the dianhydride component. For example, (i), (ii) and (iii) (in the paragraph above) include organic substances that may have two, one, or zero anhydride moieties, depending upon whether the anhydride is in a precursor state or a reacted state. Alternatively, the dianhydride component may be functionalized with additional anhydride type moieties (in addition to the anhydride moieties that react with diamine to provide a polymer). Such additional anhydride moieties could be used to crosslink the polymer or to provide other functionality to the polymer.

Any one of a number of polyimide, polyamide imide or polyester imide manufacturing processes may be used to prepare low haze polymer films. It would be impossible to discuss or describe all possible manufacturing processes useful in the practice of the present invention. It should be appreciated that the monomer systems of the present invention are capable of providing the above-described advantageous properties in a variety of manufacturing processes. The compositions of the present invention can be manufactured as described herein and can be readily manufactured in any one of many (perhaps countless) ways of those of ordinarily skilled in the art, using any conventional or non-conventional manufacturing technology.

Although methods and materials similar or equivalent to those described herein can be used in the practice or testing of the present invention, suitable methods and materials are described herein.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

In describing certain polymers, it should be understood that sometimes applicants are referring to the polymers by the monomers used to make them or the amounts of the monomers used to make them. While such a description may not include the specific nomenclature used to describe the final polymer or may not contain product-by-process terminology, any such reference to monomers and amounts should be interpreted to mean that the polymer is made from those monomers or that amount of the monomers, and the corresponding polymers and compositions thereof.

The materials, methods, and examples herein are illustrative only and, except as specifically stated, are not intended to be limiting.

As used herein, the terms "comprises," "comprising," "includes," "including," "has," "having" or any other variation thereof, are intended to cover a non-exclusive inclusion. For example, a method, process, article, or apparatus that comprises a list of elements is not necessarily limited only those elements but may include other elements not expressly listed or inherent to such method, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of the "a" or "an" are employed to describe elements and components of the invention. This is done merely for convenience and to give a general sense of the invention. This description should be read to include one or at least one and the singular also includes the plural unless it is obvious that it is meant otherwise.

Organic Solvents

Useful organic solvents for the synthesis of the polymers of the present invention are preferably capable of dissolving the polymer precursor materials. Such a solvent should also have a relatively low boiling point, such as below 225° C., so the polymer can be dried at moderate (i.e., more convenient and less costly) temperatures. A boiling point of less than 210, 205, 200, 195, 190, or 180° C. is preferred.

Solvents of the present invention may be used alone or in combination with other solvents (i.e., cosolvents). Useful organic solvents include: N-methylpyrrolidone (NMP), dimethylacetamide (DMAc), N,N'-dimethyl-formamide (DMF), dimethyl sulfoxide (DMSO), tetramethyl urea (TMU), diethyleneglycol diethyl ether, 1,2-dimethoxyethane (monoglyme), diethylene glycol dimethyl ether (diglyme), 1,2-bis-(2-methoxyethoxy) ethane (triglyme), bis [2-(2-methoxyethoxy) ethyl)] ether (tetraglyme), gamma-butyrolactone, and bis-(2-methoxyethyl) ether, tetrahydrofuran. In one embodiment, preferred solvents include N-methylpyrrolidone (NMP) and dimethylacetamide (DMAc).

Co-solvents can generally be used at about 5 to 50 weight percent of the total solvent, and useful such co-solvents include xylene, toluene, benzene, "Cellosolve" (glycol ethyl ether), and "Cellosolve acetate" (hydroxyethyl acetate glycol monoacetate).

Diamines

In one embodiment, any number of suitable diamines can be used in forming the low haze polymer film, including p-phenylenediamine (PPD), m-phenylenediamine (MPD), 2,5-dimethyl-1,4-diaminobenzene, 2,5-dimethyl-1,4-phenylenediamine (DPX), 2,2-bis-(4-aminophenyl) propane, 1,4-naphthalenediamine,1,5-naphthalenediamine, 4,4'-diaminobiphenyl, 4,4"-diaminoterphenyl, 4,4'-diamino benzanilide, 4,4'-diaminophenyl benzoate, 4,4'-diaminobenzophenone, 4,4'-diaminodiphenylmethane (MDA), 4,4'-diaminodiphenyl sulfide, 4,4'-diaminodiphenyl sulfone, 3,3'-diaminodiphenyl sulfone, bis-(4-(4-aminophenoxy)phenyl sulfone (BAPS), 4,4'-bis-(aminophenoxy)biphenyl (BAPB), 4,4'-diaminodiphenyl ether (ODA), 3,4'-diaminodiphenyl ether, 4,4'-diaminobenzophenone, 4,4'-isopropylidenedianiline, 2,2'-bis-(3-aminophenyl)propane, N,N-bis-(4-aminophenyl)-n-butylamine, N,N-bis-(4-aminophenyl) methylamine, 1,5-diaminonaphthalene, 3,3'-dimethyl-4,4'-diaminobiphenyl, m-amino benzoyl-p-amino anilide, 4-aminophenyl-3-aminobenzoate, N,N-bis-(4-aminophenyl) aniline, 2,4-diaminotoluene, 2,5-diaminotoluene, 2,6-diaminotoluene, 2,4-diamine-5-chlorotoluene, 2,4-diamine-6-chlorotoluene, 2,4-bis-(beta-amino-t-butyl) toluene, bis-(p-beta-amino-t-butyl phenyl) ether, p-bis-2-(2-methyl-4-aminopentyl) benzene, m-xylylene diamine, and p-xylylene diamine.

Other useful diamines include 1,2-bis-(4-aminophenoxy) benzene, 1,3-bis-(4-aminophenoxy) benzene, 1,2-bis-(3-aminophenoxy)benzene, 1,3-bis-(3-aminophenoxy) benzene, 1-(4-aminophenoxy)-3-(3-aminophenoxy) benzene, 1,4-bis-(4-aminophenoxy) benzene, 1,4-bis-(3-aminophenoxy) benzene, 1-(4-aminophenoxy)-4-(3-aminophenoxy) benzene, 2,2-bis-(4-[4-aminophenoxy]phenyl) propane (BAPP), 2,2'-bis-(4-phenoxy aniline) isopropylidene, 2,4,6-trimethyl-1,3-diaminobenzene, 2,4,6-trimethyl-1,3-diaminobenzene, In one embodiment, a suitable diamine for forming the low haze polymer film can include a fluorinated diamine, such as 2,2'-bis(trifluoromethyl) benzidine (TFMB), trifluoromethyl-2,4-diaminobenzene, trifluoromethyl-3,5-diaminobenzene, 2,2'-bis-(4-aminophenyl)-hexafluoro propane, 4,4'-diamino-2,2'-trifluoromethyl diphenyloxide, 3,3'-diamino-5,5'-trifluoromethyl diphenyloxide, 9.9'-bis(4-aminophenyl)fluorene, 4,4'-trifluoromethyl-2,2'-diaminobiphenyl, 4,4'-oxy-bis-[2-trifluoromethyl)benzene amine] (1,2,4-OBABTF), 4,4'-oxy-bis-[3-trifluoromethyl) benzene amine], 4,4'-thio-bis-[(2-trifluoromethyl)benzene-amine], 4,4'-thiobis[(3-trifluoromethyl)benzene amine], 4,4'-sulfoxyl-bis-[(2-trifluoromethyl)benzene amine, 4,4'-sulfoxyl-bis-[(3-trifluoromethyl)benzene amine], 4,4'-keto-bis-[(2-trifluoromethyl)benzene amine], 1,1-bis[4'-(4"-amino-2"-trifluoromethylphenoxy)phenyl]cyclopentane, 1,1-bis[4'-(4"-amino-2"-trifluoromethylphenoxy)phenyl]cyclohexane, 2-trifluoromethyl-4,4'-diaminodiphenyl ether; 1,4-(2'-trifluoromethyl-4',4"-diaminodiphenoxy)-benzene, 1,4-bis(4'-aminophenoxy)-2-[(3',5'-ditrifluoromethyl)phenyl]benzene, 1,4-bis[2'-cyano-3'("4-amino phenoxy)phenoxy]-2-[(3',5'-ditrifluoro-methyl)phenyl]benzene (6FC-diamine), 3,5-diamino-4-methyl-2',3',5',6'-tetrafluoro-4'-trifluoromethyldiphenyloxide, 2,2-Bis[4'(4"-aminophenoxy) phenyl]phthalein-3',5'-bis(trifluoromethyl)anilide (6FADAP) and 3,3',5,5'-tetrafluoro-4,4'-diamino-diphenyl-methane (TFDAM). In a specific embodiment, the fluorinated diamine is 2,2'-bis(trifluoromethyl) benzidine (TFMB).

Dianhydrides

In one embodiment, any number of suitable dianhydrides can be used in forming the low haze polymer film. The dianhydrides can be used in their tetra-acid form (or as mono, di, tri, or tetra esters of the tetra acid), or as their diester acid halides (chlorides). However, in some embodiments, the dianhydride form can be preferred, because it is generally more reactive than the acid or the ester.

Examples of suitable dianhydrides include 3,3',4,4'-biphenyl tetracarboxylic dianhydride (BPDA), 1,2,5,6-naphthalene tetracarboxylic dianhydride, 1,4,5,8-naphthalene tetracarboxylic dianhydride, 2,3,6,7-naphthalene tetracarboxylic dianhydride, 2-(3',4'-dicarboxyphenyl) 5,6-dicarboxybenzimidazole dianhydride, 2-(3',4'-dicarboxyphenyl) 5,6-dicarboxybenzoxazole dianhydride, 2-(3',4'-dicarboxyphenyl) 5,6-dicarboxybenzothiazole dianhydride, 2,2',3,3'-benzophenone tetracarboxylic dianhydride, 2,3,3',4'-benzophenone tetracarboxylic dianhydride, 3,3',4,4'-benzophenone tetracarboxylic dianhydride (BTDA), 2,2',3,3'-biphenyl tetracarboxylic dianhydride, 2,3,3',4'-biphenyl tetracarboxylic dianhydride, bicyclo-[2,2,2]-octen-(7)-2,3,5,6-tetracarboxylic-2,3,5,6-dianhydride, 4,4'-thio-diphthalic anhydride, bis (3,4-dicarboxyphenyl) sulfone dianhydride, bis (3,4-dicarboxyphenyl) sulfoxide dianhydride (DSDA), bis (3,4-dicarboxyphenyl oxadiazole-1,3,4) p-phenylene dianhydride, bis (3,4-dicarboxyphenyl) 2,5-oxadiazole 1,3,4-dianhydride, bis 2,5-(3',4'-dicarboxydiphenylether) 1,3,4-oxadiazole dianhydride, 4,4'-oxydiphthalic anhydride (ODPA), bis (3,4-dicarboxyphenyl) thio ether dianhydride, bisphenol A dianhydride (BPADA), bisphenol S dianhydride, bis-1,3-isobenzofurandione, 1,4-bis(4,4'-oxyphthalic anhydride) benzene, bis (3,4-dicarboxyphenyl) methane dianhydride, cyclopentadienyl tetracarboxylic acid dianhydride, cyclopentane tetracarboxylic dianhydride, ethylene tetracarboxylic acid dianhydride, perylene 3,4,9,10-tetracarboxylic dianhydride, pyromellitic dianhydride (PMDA), tetrahydrofuran tetracarboxylic dianhydride, 1,3-bis-(4,4'-oxydiphthalic anhydride) benzene, 2,2-bis(3,4-dicarboxyphenyl) propane dianhydride, 2,6-dichloronaphthalene-1,4,5,8-tetracarboxylic dianhydride, 2,7-dichloronaphthalene-1,4,5,8-tetracarboxylic dianhydride, 2,3,6,7-tetrachloronaphthalene-1,4,5,8-tetracarboxylic dianhydride, phenanthrene-1,8,9,10-tetracarboxylic dianhydride, pyrazine-2,3,5,6-tetracarboxylic dianhydride, benzene-1,2,3,4-tetracarboxylic dianhydride, thiophene-2,3,4,5-tetracarboxylic dianhydride and cyclobutane dianhydride (CBDA).

In one embodiment, a suitable dianhydride for forming the low haze polymer film can include a fluorinated dianhydride, such as 4,4'-(hexafluoroisopropylidene)diphthalic anhydride (6FDA) and 9,9-bis (trifluoromethyl)-2,3,6,7-xanthene tetracarboxylic dianhydride. In a specific embodiment, the fluorinated dianhydride is 4,4'-(hexafluoroisopropylidene)diphthalic anhydride (6FDA).

Other Monomers

In one embodiment, any number of suitable acid anhydrides, such as trimellitic anhydride, which has a difunctional carboxylic group, acyl halides, such as trimellitic anhydride chloride, and isocyanates can be used in forming a low haze polymer film. In one embodiment, a suitable acyl halide can include a dicarboxylic dihalide such as terephthaloyl chloride (TPCl), isophthaloyl chloride (IPCl), biphenyl dicarbonyl chloride (BPCl), naphthalene dicarbonyl chloride, terphenyl dicarbonyl chloride and 2-fluoro-terephthaloyl chloride. In one embodiment, a suitable isocyanate can include a diisocyanate such as 1,4-phenylene diisocyanate (PPDI), 1,5-naphthalene diisocyanate (NDI), diisocyanate diphenylmethane, 1,3-isocyanato-6-methyl-benzene and 1,5-diisocyanato-1,3,3-trimethyl-cyclohexane.

Refractive Index-Matching Nanoparticle Aggregates

In one embodiment, refractive index-matching nanoparticle aggregates include a blend of nanoparticles whose composition is tailored to approximately match the refractive index of the polymer. By using a combination of higher and lower refractive index nanoparticles, these nanoparticles can aggregate but will not increase the optical haze of the film, because the refractive index difference between the aggregate and polymer is diminished. In addition, an unexpected result, in the presence of an imidization catalyst or combination of catalysts, is that the nanoparticles coalesce at significantly similar rates and homogeneously, so that the nanoparticle aggregate has approximately the same refractive index as the polymer film and the aggregates are significantly uniform in composition to minimize light scattering. In this way, a blend of nanoparticles can behave, optically, as a single aggregate whose refractive index can be designed by choosing the volume fraction of each nanoparticle in the aggregate and their refractive indices. In one embodiment, nanoparticles can be less than about 100 nm in their longest dimension. In a specific embodiment, nanoparticles can be less than about 75 nm in their longest dimension. In a more specific embodiment, nanoparticles can be less than about 50 nm in their longest dimension. In one embodiment, nanoparticles can be any shape, including spherical and oblong, and are relatively uniform in size. They can be hollow, porous, or solid.

In one embodiment, nanoparticles can include inorganic oxides, such as oxides of silicon, aluminum and titanium, hollow (porous) silicon oxide, antimony oxide, zirconium oxide, indium tin oxide, antimony tin oxide, mixed titanium/tin/zirconium oxides, and binary, ternary, quaternary and higher order composite oxides of one or more cations selected from silicon, titanium, aluminum, antimony, zirconium, indium, tin, zinc, niobium and tantalum. In one embodiment, nanoparticle composites (e.g. single or multiple core/shell structures) can be used, in which one oxide encapsulates another oxide in one particle.

In one embodiment, nanoparticles can include other ceramic compounds, such as boron nitride, aluminum nitride, ternary or higher order compounds containing boron, aluminum and nitrogen, gallium nitride, silicon nitride, aluminum nitride, zinc selenide, zinc sulfide, zinc telluride, silicon carbide, and their combinations, or higher order compounds containing multiple cations and multiple anions.

In one embodiment, solid silicon oxide nanoparticles can be produced from sols of silicon oxides (e.g., colloidal dispersions of solid silicon oxide nanoparticles in liquid media), especially sols of amorphous, semi-crystalline, and/or crystalline silica. Such sols can be prepared by a variety of techniques and in a variety of forms, which include hydrosols (i.e., where water serves as the liquid medium), organosols (i.e., where organic liquids serves as the liquid medium), and mixed sols (i.e., where the liquid medium comprises both water and an organic liquid). See, e.g., descriptions of the techniques and forms disclosed in U.S. Pat. Nos. 2,801,185, 4,522,958 and 5,648,407. In one embodiment, the nanoparticle is suspended in a polar, aprotic solvent, such as, DMAc or other solvent compatible with polyamic acid or poly(amide amic acid). In another embodiment, solid nanosilica particles can be commercially obtained as colloidal dispersions or sols dispersed in polar aprotic solvents, such as for example DMAC-ST (Nissan Chemical America Corporation, Houston Tex.), a solid silica colloid in dimethylacetamide containing less than 0.5 percent water, with 20-21 wt % $SiO_2$, with a median nanosilica particle diameter $d_{50}$ of about 16 nm.

In one embodiment, nanoparticles can be porous and can have pores of any shape. One example is where the pore comprises a void of lower density and low refractive index (e.g., a void containing air) formed within a shell of an oxide such as silicon oxide, i.e., a hollow silicon oxide nanoparticle. The thickness of the nanoparticle shell affects the strength of the nanoparticles. As the hollow silicon oxide particle is rendered to have reduced refractive index and increased porosity, the thickness of the shell decreases resulting in a decrease in the strength (i.e., fracture resistance) of the nanoparticles. Methods for producing such hollow silicon oxide nanoparticles are known, for example, as described in Japanese Patent Nos. 440692162 and 403162462. Hollow silicon oxide nanoparticles can be obtained from JGC Catalysts and Chemicals, LTD, Japan.

In one embodiment, nanoparticles can be coated with a coupling agent. For example, a nanoparticle can be coated with an aminosilane, phenylsilane, acrylic or methacrylic coupling agents derived from the corresponding alkoxysilanes. Trimethylsilyl surface capping agents can be introduced to the nanoparticle surface by reaction of the nanoparticles with hexamethyldisilazane. In one embodiment, nanoparticles can be coated with a dispersant. In one embodiment, nanoparticles can be coated with a combination of a coupling agent and a dispersant. Alternatively, the coupling agent, dispersant or a combination thereof can be incorporated directly into the polymer film and not necessarily coated onto the nanoparticles.

The surface coating on an inorganic nanoparticle will affect the refractive index of the nanoparticle. The refractive index of the nanoparticle with the surface coating can be estimated by summing the volume fraction of the surface coating multiplied by its refractive index and the volume fraction of the inorganic core multiplied by the refractive index of the core. In one embodiment, a nanoparticle can be a titanium dioxide. Solid titanium oxide nanoparticles can be obtained from JGC Catalysts and Chemicals, LTD. Depending on the oxide and coupling agent on the nanoparticles (see below) the refractive index can be either approximately 1.95 (anatase, for example DU-1013TIV) or 1.86 (rutile, DU-1014TIV).

In one embodiment, a polymer for a low haze polymer film may have an index of refraction in the range of from about 1.5 to about 1.8. In a specific embodiment, a polymer may have an index of refraction in the range of from about 1.5 to about 1.7. To form a low haze polymer film using this polymer, a blend of high and low index nanoparticles is selected such that a difference in the refractive indices of the polymer and the refractive index-matching nanoparticle aggregate is less than about 0.1. For example, a high index nanoparticle, such as $TiO_2$, with an index of refraction of approximately 1.86 in the rutile form, may be blended with a low index nanoparticle, such as $SiO_2$, with an index of refraction of approximately 1.46, to form a mixture of 25 vol % $TiO_2$ and 75 vol % $SiO_2$, with a composite index of refraction of approximately 1.56 for the aggregate. The blend of nanoparticles combines to form aggregates that essentially maintain the volume ratio of low and high index nanoparticles. By keeping the difference in the refractive indices of the polymer and the refractive index-matching nanoparticle aggregate to less than about 0.1, the low haze of the polymer film is maintained.

In one embodiment, for a polyimide with a refractive index in the range of from about 1.5 to about 1.65, useful nanoparticles with a low index of refraction include silicon oxide, porous silicon oxide, and group I and group II metal fluorides, such as CsF, $MgF_2$, $CaF_2$, $SrF_2$, $BaF_2$, and useful nanoparticles with a high index of refraction include titanium dioxide, zirconium oxide, niobium oxide, tantalum oxide, zinc oxide, barium oxide, tin oxide, cerium oxide, antimony oxide, yttrium oxide and aluminum oxide.

Those skilled in the art will appreciate that the refractive indices of nanoparticles will be affected by any surface coating or functionalization layer formed thereon. In one embodiment, combinations of oxide phases, such as core-shell particles, can be used as nanoparticles. In one embodiment, ternary and higher order oxides can be used.

Low Haze Polymer Films

In one embodiment a low haze polymer film can include a polyimide, which can be produced by combining a diamine and a dianhydride (monomer or other polyimide precursor form) together with a solvent to form a polyamic acid (also called a polyamide acid) solution. The dianhydride and diamine can be combined in a molar ratio of about 0.90 to 1.10. The molecular weight of the polyamic acid formed therefrom can be adjusted by adjusting the molar ratio of the dianhydride and diamine. Haze is defined in transmission by collecting forward scattered light using the method described by ASTM1003, and measures the amount of light which deviates from the incident beam by more than 2.5 degrees on average. In one embodiment, a low haze polymer film has a haze of less than 4%, or less than 2%, or less than 1%.

In one embodiment, a polyamic acid casting solution is derived from the polyamic acid solution. The polyamic acid casting solution preferably comprises the polyamic acid solution can optionally be combined with conversion chemicals like: (i) one or more dehydrating agents, such as, aliphatic acid anhydrides (acetic anhydride, etc.) and/or aromatic acid anhydrides; and (ii) one or more catalysts, such as, aliphatic tertiary amines (triethyl amine, etc.), aromatic tertiary amines (dimethyl aniline, etc.) and heterocyclic tertiary amines (pyridine, picoline, isoquinoline, etc.). The anhydride dehydrating material it is often used in molar excess compared to the amount of amide acid groups in the polyamic acid. The amount of acetic anhydride used is typically about 2.0-4.0 moles per equivalent (repeat unit) of polyamic acid. Generally, a comparable amount of tertiary amine catalyst is used. Nanoparticles, dispersed or suspended in solvent as described above, are then added to the polyamic acid solution.

In one embodiment, the polyamic acid solution, and/or the polyamic acid casting solution, is dissolved in an organic solvent at a concentration from about 5.0 or 10% to about 15, 20, 25, 30, 35 and 40% by weight.

The polyamic acid (and casting solution) can further comprise any one of a number of additives, such as processing aids (e.g., oligomers), antioxidants, light stabilizers, flame retardant additives, anti-static agents, heat stabilizers, ultraviolet absorbing agents, inorganic fillers or various reinforcing agents. Those skilled in the art will appreciated that depending on their refractive indices, size and how well dispersed they are, these additives can impact the overall haze of the low haze polymer film, and thus must be appropriately selected to not significantly increase haze. Inorganic fillers can include thermally conductive fillers, metal oxides, inorganic nitrides and metal carbides, and electrically conductive fillers like metals, graphitic carbon and carbon fibers. Common inorganic fillers are alumina, silica, silicon carbide, diamond, clay, boron nitride, aluminum nitride, titanium dioxide, dicalcium phosphate, and fumed metal oxides. Common organic fillers include polyaniline, polythiophene, polypyrrole, polyphenylenevinylene, polydialkylfluorenes, carbon black, graphite, multiwalled and single walled carbon nanotubes and carbon nanofibers.

The solvated mixture (the polyamic acid casting solution) can then be cast or applied onto a support, such as an endless belt or rotating drum, to give a film. In one embodiment, the polyamic acid can be solution cast in the presence of an imidization catalyst. Use of an imidization catalyst can help to lower the imidization temperature and shorten the imidization time, and can also help in the formation of refractive index-matching nanoparticle aggregates that essentially maintain the volume ratio of low and high index nanoparticles in the aggregate. Typical imidization catalysts can range from bases such as imidazole, 1-methylimidazole, 2-methylimidazole, 1,2-dimethylimidazole, 2-phenylimidazole, benzimidazole, isoquinoline, or substituted pyridines such as methyl pyridines, lutidine, and trialkylamines. Combinations of the tertiary amines with acid anhydrides can be used. These dehydration agents, which can act as co-catalysts, include acetic anhydride, propionic anhydride, n-butyric anhydride, benzoic anhydride and others. The ratio of these catalysts and their concentration in the polyamic acid layer will influence imidization kinetics and the film properties. Next, the solvent containing-film can be converted into a self-supporting film by heating at an appropriate temperature (thermal curing) together with conversion chemical reactants (chemical curing). The film can then be separated from the support, oriented such as by tentering, with continued thermal and chemical curing to provide a polyimide film.

Useful methods for producing low haze polymer films containing a polyimide in accordance with the present invention can be found in U.S. Pat. Nos. 5,166,308 and 5,298,331, which are incorporate by reference into this specification for all teachings therein. Numerous variations are also possible, such as, (a) A method wherein the diamine components and dianhydride components are preliminarily mixed together and then the mixture is added in portions to a solvent while stirring.

(b) A method wherein a solvent is added to a stirring mixture of diamine and dianhydride components. (contrary to (a) above)

(c) A method wherein diamines are exclusively dissolved in a solvent and then dianhydrides are added thereto at such a ratio as allowing to control the reaction rate.

(d) A method wherein the dianhydride components are exclusively dissolved in a solvent and then amine components are added thereto at such a ratio to allow control of the reaction rate.

(e) A method wherein the diamine components and the dianhydride components are separately dissolved in solvents and then these solutions are mixed in a reactor.

(f) A method wherein the polyamic acid with excessive amine component and another polyamic acid with excessive dianhydride component are preliminarily formed and then reacted with each other in a reactor, particularly in such a way as to create a non-random or block copolymer.

(g) A method wherein a specific portion of the amine components and the dianhydride components are first reacted and then the residual diamine components are reacted, or vice versa.

(h) A method wherein the conversion chemicals (catalysts) are mixed with the polyamic acid to form a polyamic acid casting solution and then cast to form a gel film.

(i) A method wherein the components are added in part or in whole in any order to either part or whole of the solvent, also where part or all of any component can be added as a solution in part or all of the solvent.

(j) A method of first reacting one of the dianhydride components with one of the diamine components giving a first polyamic acid. Then reacting another dianhydride component with another amine component to give a second polyamic acid. Then combining the amic acids in any one of a number of ways prior to film formation.

In one embodiment, if the polyimide is soluble in a non-protic solvent, such as DMAc or NMP, the polyimide can be formed in solution, optionally with the addition of catalysts at higher temperatures (>50° C.). After filtration, the polyimide powder can be re-dissolved in a solvent. The polyimide solution can then be cast onto a support (e.g. a moving belt or rigid support) and coalesced to create a polyimide film.

In one embodiment, a low haze polymer film can include a polyamide imide, which can be produced by reacting a trimellitic anhydride, trimellitic anhydride chloride or terephthaloyl chloride with an aromatic diamine in a polar aprotic solvent. The resulting poly(amide amic acid) can be imidized in solution by adding a catalyst and dehydrating agent (pyridine and acetic anhydride, for example) with mild heating. Following the imidization reaction in solution, in many cases, the polyamide imide can be precipitated by an alcohol solvent such as methanol. After washing and redissolution in a polar, non-protic solvent, the resulting polyamide imide solution can then be cast into or coalesced into a film using methods described above for the formation of polyimide films. Alternatively, a diamine and a dicarboxylic dihalide for forming the amide structural unit can be reacted to form an amide oligomer having an amino group at both ends thereof. A dianhydride can then be added to the resultant, which is used as a diamine monomer, to prepare a poly(amide amic acid). In one embodiment, a low haze polymer film can include a polyester imide, which can be produced by reacting a trimellitic anhydride with an aromatic diamine in the presence of a dihydroxy alcohol such as ethylene glycol. The dihydroxyalcohol acts as an esterification agent to produce the polyesteramic acid. This can be precipitated in dimethylformamide and washed before re-dissolving and casting into a polyester imide film.

In one embodiment, the refractive index-matching nanoparticle aggregate is present in the low haze polymer film in an amount in the range of from about 0.001 to about 70 volume percent in the dry film, or from about 5 to about 50 volume percent in the dry film, or from about 10 to about 40 volume percent in the dry film.

The thickness of the polymer film may be adjusted, depending on the intended purpose of the film or final application specifications. In one embodiment, the low haze polymer film has a total thickness in a range of from about 1 to about 150 μm, or from about 5 to about 125 μm, or from about 10 to about 75 μm, or from about 20 to 50 about μm.

Applications

In one embodiment, a low haze polymer film can be used in electronic device applications, such as in an organic electronic device. Organic electronic devices that may benefit from having one or more low haze polymer layers include, but are not limited to, (1) devices that convert electrical energy into radiation (e.g., a light-emitting diode, light emitting diode display, lighting device, luminaire, or diode laser), (2) devices that detect signals through electronics processes (e.g., photodetectors, photoconductive cells, photoresistors, photoswitches, phototransistors, phototubes, IR detectors, biosensors), (3) devices that convert radiation into electrical energy, (e.g., a photovoltaic device or solar cell), (4) devices that convert light of one wavelength to light of a longer wavelength, (e.g., a down-converting phosphor device); and (5) devices that include one or more electronic components that include one or more organic semi-conductor layers (e.g., a transistor or diode). Other uses for low haze polymer films can include memory storage devices, antistatic films, biosensors, electrochromic devices, solid electrolyte capacitors, energy storage devices such as a rechargeable battery, and electromagnetic shielding applications.

In one embodiment, a low haze polymer film can act as a flexible replacement for glass in an electronic device, such as an organic electronic device, to form a flexible display device. Layers that may or may not be present in organic electronic devices include color filters, touch sensor panels, and/or cover sheets (also known as cover lenses or cover films). One or more of these layers, in addition to the substrates used within these layers or other parts of the device, may be made from the low haze polymer films disclosed herein. In a specific embodiment, a low haze polymer film can be used in a cover sheet for and electronic device.

In one embodiment, a cover sheet (cover lens or cover window) also includes a hard coat layer, an anti-reflection layer, or both a hard coat layer and anti-reflection layer. A hard coat, such as a siloxane or acrylate layer, or a nanoparticle composite layer, may be used on the surface of a low haze polymer film to increase the surface hardness of the cover sheet, enabling the formation of a curved protective film that matches the profile of a curved display. The cover sheet must be moldable at relatively high temperatures, typically near or above the $T_g$ of the polymer and able to maintain relatively high flexibility (that is, a relatively small bending radius) and a relatively high elongation-to-break, while maintaining sufficient hardness.

The advantageous properties of this invention can be observed by reference to the following examples that illustrate, but do not limit, the invention. All parts and percentages are by weight unless otherwise indicated.

EXAMPLES

Test Methods

Measurement of CIE L*, a*, b* Color

Color measurements were performed using a ColorQuest® XE dual-beam spectrophotometer (Hunter Associates Laboratory, Inc., Reston, Va.), using D65 illumination and 10 degree observer, in total transmission mode over a wavelength range of 360 to 780 nm.

Haze

Haze was measured using a Haze-Guard Plus (BYK-Gardner GmbH, Germany), with the haze measured in transmission by collecting forward scattered light using the method described by ASTM1003. Percent haze was determined by measuring the amount of light which deviates from the incident beam by more than 2.5 degrees on average over a wavelength range of approximately 380 to 710 nm.

Example 1

For Example 1 (E1), a polyamic acid solution with a monomer composition of BPDA 0.2/6FDA 0.8//TFMB 1.0 (molar equivalents) was made in a lab-scale preparation. To a 500 ml liter nitrogen purged resin kettle, 27.924 g of trifluromethylbenzidine (TFMB, Seika Corporation, Wakayama Seika Kogyo Co., LTD., Japan) was added to 190.027 g of dimethyl acetamide (HPLC grade, Honeywell, USA). 5.003 g of biphenyl tetracarboxylic acid dianhydride (BPDA, Mitsubishi Chemical Co., Japan) and 30.215 g of 4,4'-(hexafluoroisopropylidene)diphthalic anhydride (6FDA, Synasia, Metuchen, N.J.) were added in three aliquots over three 5-10 intervals. An additional 47.507 g of DMAc was added. The reaction mixture was held at 40° C. during these additions. The polymer was "finished" to ~2400 poise using small additions of 6 wt % PMDA solution in DMAc.

Methyl isobutyl ketone (MIBK) was exchanged for DMAc for $TiO_2$ nanoparticles (ELCOM grade DU-1013TIV, 20.5 wt % anatase $TiO_2$ in MIBK, Shokubai Kasei Kogyo Kabushiki Kaisha, Japan) by adding 108.20 g of colloid with 94.31 g DMAc. The mixture was placed on a rotary evaporator (Laborota 4001 Efficient, Heidolph Instruments GmbH & Co. KG, Germany) and heated to 32° C., at 15 mbar for 6 hours to complete the exchange. The final weight fraction after exchanging was 27.85 wt %.

16.896 g of polyamic acid was combined with 1.3454 g of $TiO_2$ nanoparticles, (now 27.85 wt % in DMAc) and 1.730 g of $SiO_2$ (20.5 wt % in DMAc, DMAC-ST, Nissan Chemicals, Houston, Tex.). The polymer was de-gassed using a centrifugal-planetary mixer (THINKY USA, Laguna Hills, Calif.) to force the gas from the pre-polymer at 2000 rpm for 5 minutes followed by 2200 rpm for 30 seconds. This procedure was repeated if further de-gassing of the polymer was needed. The polyamic acid/nanoparticle mixture was then placed in a freezer and cooled to ~–5° C. 4.51 g of beta-picoline (P42053, Sigma-Aldrich, Milwaukee, Wis.) and 4.95 g of acetic anhydride (539996, Sigma-Aldrich) were combined with the polyamic acid/nanoparticle mixture and briefly placed on a centrifugal-planetary mixture at 2000 rpm for 1 minute followed by 2200 rpm for 30 seconds. The mixture was cast on glass plate at 25° C. using a doctor blade with a 15 mil clearance (for ~1 mil cured films).

Examples 2 and 3 and Comparative Examples 1 to 4

For Examples 2 and 3 (E2-E3) and Comparative Examples 1 to 4 (CE1-CE4), the same procedure as described for E1 was used, but with different amounts of polyamic acid, $TiO_2$ and $SiO_2$.

For E2, 17.032 g of polyamic acid was combined with 1.0707 g of $TiO_2$ colloid and 1.969 g of $SiO_2$ colloid.

For E3, 17.119 g of polyamic acid was combined with 0.8968 g of $TiO_2$ colloid and 2.120 g of $SiO_2$ colloid.

For CE1, 17.568 g of polyamic acid was combined with 2.901 g of $SiO_2$ colloid.

For CE2, 15.900 g of polyamic acid was combined with 3.3317 g of $TiO_2$ colloid.

For CE3, 18.613 g of polyamic acid was combined with 1.3866 g of $TiO_2$ colloid.

For CE4, 18.665 g of polyamic acid was combined with 1.834 g of $SiO_2$ colloid.

Table 1 summarizes the optical measurements. While the film with 3.8 vol % of $TiO_2$ nanoparticles (CE3), with no $SiO_2$, had good color and haze, at higher loadings (10 vol %, CE2), the optical properties deteriorate. Films with $SiO_2$ nanoparticles only (CE1 and CE4) have poor haze. This contrasts with the mixed $TiO_2$/$SiO_2$ nanoparticle films, all of which have both good color and haze. E1, which haze the same 6.2 vol % loading of $SiO_2$ as CE4, has significantly better haze. Table 2 shows that for the mixed nanoparticle films with good color and haze (E1-E4), the difference between the refractive index (R.I.) of the refractive index-matching nanoparticle aggregate and that of the polyimide is less than about 0.1. The refractive index of the refractive index-matching nanoparticle aggregate (R.I. aggregate) is calculated based on the volume fractions of $TiO_2$ (anatase), R.I.=1.95, and $SiO_2$, R.I.=1.46.

High resolution transmission electron microscopy (TEM) imaging shows that for all film, nanoparticle aggregates of greater than 100 nm are formed. For the films with a mixture of $TiO_2$ and $SiO_2$ (E1-E3), the aggregates are a combination of larger $SiO_2$ nanoparticles and $TiO_2$ nanoparticles.

TABLE 1

| Example | Volume fraction $TiO_2$ | Volume fraction $SiO_2$ | Volume fraction polyimide | Thickness (μm) | L* | a* | b* | % Haze |
|---|---|---|---|---|---|---|---|---|
| E1 | 0.038 | 0.062 | 0.900 | 23.2 | 95.01 | −0.18 | 2.79 | 3.11 |
| E2 | 0.030 | 0.070 | 0.900 | 20.5 | 95.48 | −0.21 | 2.24 | 2.72 |
| E3 | 0.025 | 0.075 | 0.900 | 23.0 | 95.19 | −0.22 | 2.91 | 3.98 |
| CE1 | 0 | 0.100 | 0.900 | 22.0 | 93.79 | −0.13 | 3.86 | 21.11 |
| CE2 | 0.100 | 0 | 0.900 | 21.5 | 92.71 | −0.41 | 8.92 | 5.93 |

TABLE 1-continued

| Example | Volume fraction TiO$_2$ | Volume fraction SiO$_2$ | Volume fraction polyimide | Thickness (μm) | L* | a* | b* | % Haze |
|---|---|---|---|---|---|---|---|---|
| CE3 | 0.038 | 0 | 0.962 | 19.0 | 95.77 | −0.11 | 1.36 | 0.53 |
| CE4 | 0 | 0.062 | 0.938 | 21.7 | 94.62 | −0.03 | 2.46 | 10.99 |

TABLE 2

| Example | Volume fraction TiO$_2$ | Volume fraction SiO$_2$ | Volume fraction polyimide | R.I. polyimide | R.I. aggregate | Δ R.I. |
|---|---|---|---|---|---|---|
| E1 | 0.038 | 0.062 | 0.900 | 1.590 | 1.646 | 0.056 |
| E2 | 0.030 | 0.070 | 0.900 | 1.590 | 1.607 | 0.017 |
| E3 | 0.025 | 0.075 | 0.900 | 1.590 | 1.582 | 0.008 |
| CE1 | 0 | 0.100 | 0.900 | 1.590 | 1.460 | 0.130 |
| CE2 | 0.100 | 0 | 0.900 | 1.590 | 1.950 | 0.360 |
| CE3 | 0.038 | 0 | 0.962 | 1.590 | 1.950 | 0.360 |
| CE4 | 0 | 0.062 | 0.938 | 1.590 | 1.460 | 0.130 |

Note that not all of the activities described above in the general description are required, that a portion of a specific activity may not be required, and that further activities may be performed in addition to those described. Still further, the order in which each of the activities are listed are not necessarily the order in which they are performed. After reading this specification, skilled artisans will be capable of determining what activities can be used for their specific needs or desires.

In the foregoing specification, the invention has been described with reference to specific embodiments. However, one of ordinary skill in the art appreciates that various modifications and changes can be made without departing from the scope of the invention as set forth in the claims below. All features disclosed in this specification may be replaced by alternative features serving the same, equivalent or similar purpose.

Accordingly, the specification and figures are to be regarded in an illustrative rather than a restrictive sense and all such modifications are intended to be included within the scope of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims.

What is claimed is:

1. A low haze polymer film comprising:
   a polymer comprising a polyimide, a polyamide imide or a polyester imide; and
   5 to 50 volume percent of a refractive index-matching nanoparticle aggregate comprising a blend of a first nanoparticle having a refractive index that is less than the refractive index of the polymer and a second nanoparticle having a refractive index that is greater than the refractive index of the polymer, wherein:
   a difference in the refractive indices of the polymer and the refractive index-matching nanoparticle aggregate is less than 0.1; and
   the low haze polymer film has a thickness in a range of from 1 to 150 μm and a haze of less than 4%.

2. The low haze polymer film of claim 1, wherein the polymer comprises a polyimide comprising a dianhydride selected from the group consisting of 3,3',4,4'-biphenyl tetracarboxylic dianhydride, pyromellitic dianhydride, cyclobutane dianhydride, 4,4'-(hexafluoroisopropylidene) diphthalic anhydride and mixtures thereof.

3. The low haze polymer film of claim 1, wherein the polymer comprises a polyimide comprising a fluorinated dianhydride.

4. The low haze polymer film of claim 3, wherein the fluorinated dianhydride comprises 4,4'-(hexafluoroisopropylidene)diphthalic anhydride.

5. The low haze polymer film of claim 1, wherein the polymer comprises a polyimide comprising a fluorinated diamine.

6. The low haze polymer film of claim 5, wherein the fluorinated diamine comprises 2,2'-bis(trifluoromethyl) benzidine.

7. The low haze polymer film of claim 1, wherein the first nanoparticle is selected from the group consisting of silicon oxide, porous silicon oxide, a group I metal fluoride, a group II metal fluoride and mixtures thereof.

8. The low haze polymer film of claim 1, wherein the second nanoparticle is selected from the group consisting of titanium dioxide, zirconium oxide, niobium oxide, tantalum oxide, zinc oxide, barium oxide, tin oxide, cerium oxide, antimony oxide, ytrrium oxide, aluminum oxide and mixtures thereof.

9. The low haze polymer film of claim 1, wherein the low haze polymer film has an L* of greater than 90.

10. The low haze polymer film of claim 1, wherein the low haze polymer film has a thickness in a range of from 5 to 125 μm.

11. The low haze polymer film of claim 1, wherein the refractive index-matching nanoparticle aggregate is present in the low haze polymer film in an amount in the range of from 10 to 40 volume percent.

12. An electronic device comprising the low haze polymer film of claim 1.

13. The electronic device of claim 12, wherein the low haze polymer film is used in device components selected from the group consisting of device substrates, substrates for color filter sheets, cover sheets, and touch sensor panels.

14. The electronic device of claim 13, wherein the cover sheet further comprises a hard coat layer, an anti-reflection layer, or both a hard coat layer and anti-reflection layer.

* * * * *